June 24, 1924.  1,499,032

H. RIEDESEL

DEVICE FOR REMOVING CUPS OR RACES

Filed April 9, 1923

Inventor.
Herbert Riedesel
Clarence J. Loftus
by
Attorney

Patented June 24, 1924.

1,499,032

UNITED STATES PATENT OFFICE.

HUBERT RIEDESEL, OF LANESBORO, IOWA.

DEVICE FOR REMOVING CUPS OR RACES.

Application filed April 9, 1923. Serial No. 630,704.

*To all whom it may concern:*

Be it known that I, HUBERT RIEDESEL, a citizen of the United States, residing at Lanesboro, in the county of Carroll and State of Iowa, have invented a certain new and useful Improvement in a Device for Removing Cups or Races.

This invention pertains to an improved device for removing cups or races from sockets and particularly the inner cups or races from the hub of automobile wheels and the like.

It is an object of my invention to provide an improved device of this character with means for holding it in proper alignment while being utilized.

The above and other features of novelty, advantages and capabilities, will become apparent from a detailed description of the accompanying drawings, in which I have illustrated one form of my invention, but the construction there shown will be understood as illustrative only and not as defining the limits of my invention.

Figure 1:
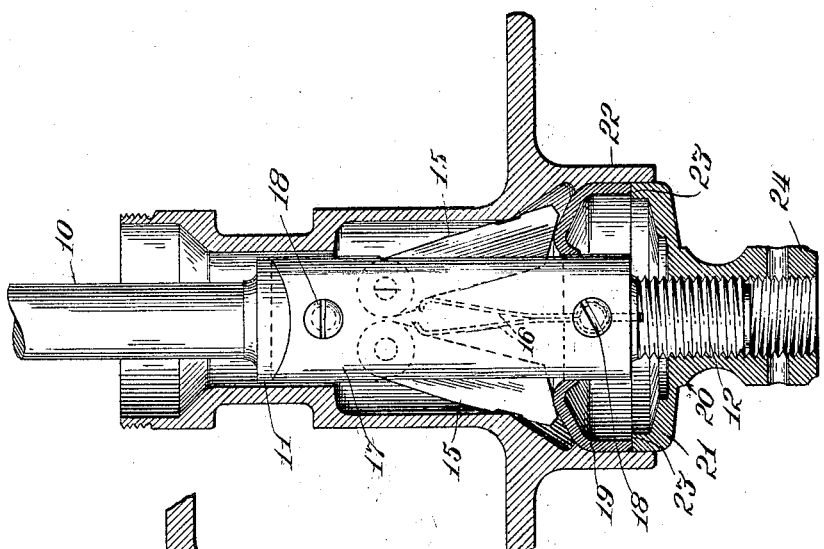
Fig. 1 is an elevational view of a race or cup remover embodying one form of my invention, showing it in position, ready for removing the inner race or cup from a conventional hub for automobile wheels, the hub and parts thereof being in cross section.
Figure 2:
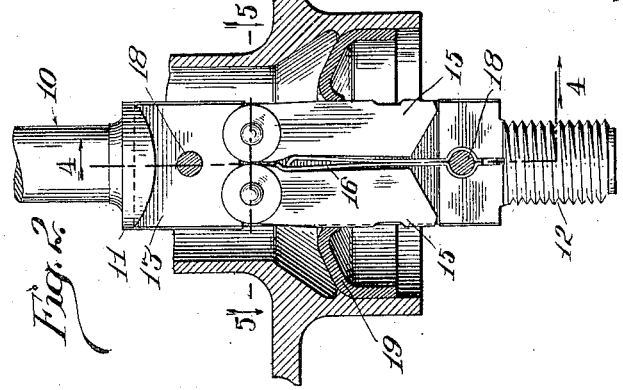
Fig. 2 is a similar view with the aligning and retaining cap removed.

Referring to the drawings in detail, the device consists of a handle 10, whose diameter is such as to permit it to be passed through the hub or bore of the socket. This handle is provided at its lower end with an enlarged head 11, and a screw threaded extension 12. The head is provided with an elongated vertical groove or opening 13 in which is pivotally mounted by any suitable means a pair of pawls 15 normally pressed outwardly by means of a leaf spring 16 mounted in the head. The open side of the head is closed by a side member 17, which is removably held in place by means of the screws 18.

The device in use is drawn through the opening in the hub until the pawls pass the cup or race 19 whereupon they are swung outwardly by means of the leaf spring into the position shown in Fig. 1. By tapping on the end of the handle 10 with a hammer or the like, the pawls 15 exert an outward pressure on the race or cup, thus forcing it out.

Figure 3:
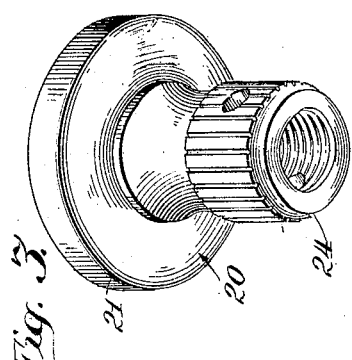
Fig. 3 is an enlarged perspective view of the aligning and retaining cap.
Figure 4:
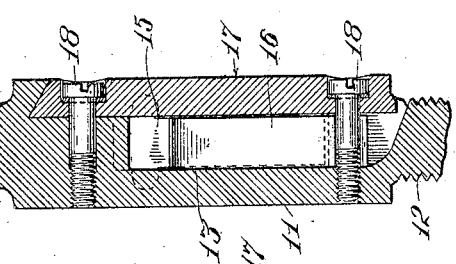
Fig. 4 is a sectional view taken on the line 4—4 of Fig. 2.
Figure 5:
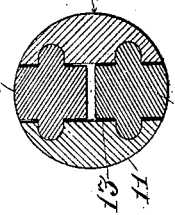
Fig. 5 is a sectional view taken on the line 5—5 of Fig. 2.

Due to the fact that the handle and head must be somewhat smaller than the bore there is a chance for a play or swinging movement, making it difficult to keep the handle in proper alignment with respect to the bore in order that an even and equal pressure be exerted by both pawls on the race or cups. Therefore, the handle is very apt to swing into a position slightly at an angle to the race or cup, as a result of which most of the pressure will be exerted by one of the two pawls which has a tendency to twist and wedge the race or cup in the bore, thus making it more difficult to remove. Therefore, I have provided means which maintains the device in perfect alignment so that the pressure or force exerted on the race or cup is evenly distributed between the two pawls. In the modification shown, such means comprise an interiorly screw threaded cap (as best shown in Figs. 1 and 3), having a bearing shoulder 21 adapted to fit within the bore of the hub 22 and bear on its inner end or edge 23, against the outer edge of the race 19. The cap 20 is also provided with a knob or handle 24 so that it may be easily turned by hand for screwing onto the extension 12 and against the race 19. This cap has the further advantage or function of holding the pawls tightly against the inner end of the race during the entire operation and removal.

Having thus described my invention, what I claim is:

1. In a device for removing inner cups from automobile wheel hubs and the like, comprising in combination a head, opposed pawls pivotally mounted in said head, and means for automatically aligning said heads and pawls substantially as and for the purpose set forth.

2. In a device for removing cups or races from automobile wheel hubs and the like, comprising in combination a head, opposed pawls, pivotally mounted in said head, an extension on said head and a cap co-operating with said extension for automatically aligning said head and pawls substantially as and for the purpose set forth.

In witness whereof, I have hereunto subscribed my name to this specification in the presence of two witnesses.

HUBERT RIEDESEL.

Witnesses:
H. M. SMITH,
K. A. HARGADEN.